(No Model.) 3 Sheets—Sheet 1.

A. F. BANNISTER.
MACHINE FOR GRINDING CUTLERY.

No. 543,076. Patented July 23, 1895.

Witnesses:
James P. Mount
Susie H. Moore

Inventor:
Alfred F. Bannister,
by Scott & Barlow.
Attorneys.

(No Model.) 3 Sheets—Sheet 2.

A. F. BANNISTER.
MACHINE FOR GRINDING CUTLERY.

No. 543,076. Patented July 23, 1895.

Witnesses:
James T. Mount
Susie H. Moore

Inventor:
Alfred F. Bannister,
By Scott & Barlow
Attorneys.

(No Model.) 3 Sheets—Sheet 3.

A. F. BANNISTER.
MACHINE FOR GRINDING CUTLERY.

No. 543,076. Patented July 23, 1895.

Witnesses:
James N. Mount
Susie H. Moore

Inventor:
Alfred F. Bannister,
by Scott & Barlow.
Attorneys.

UNITED STATES PATENT OFFICE.

ALFRED F. BANNISTER, OF NEWARK, NEW JERSEY.

MACHINE FOR GRINDING CUTLERY.

SPECIFICATION forming part of Letters Patent No. 543,076, dated July 23, 1895.

Application filed May 24, 1894. Serial No. 512,375. (No model.)

*To all whom it may concern:*

Be it known that I, ALFRED F. BANNISTER, a citizen of the United States, residing at Newark, in the county of Essex and State of New Jersey, have invented certain new and useful Improvements in Machines for Grinding Cutlery, &c.; and I do hereby declare the following to be a full, clear, and exact description of the invention, such as will enable others skilled in the art to which it appertains to make and use the same.

My invention relates to machines for grinding cutlery, &c., and is more especially designed for use by manufacturers of cutlery, saws, metallic rules, &c.

The object of my invention is to provide a machine of the class stated which will grind cutlery &c., rapidly, economically, and with a uniform accuracy.

An additional object sought to be attained by my invention is to produce a surface on cutlery in grinding the same which shall be flat or unbeveled as distinguished from the convex surface heretofore largely in use, more particularly upon table-cutlery.

My invention consists in the improved machine for accomplishing the above-stated objects hereinafter described, and illustrated by the accompanying drawings, which form a part of the specification.

Figure 1:
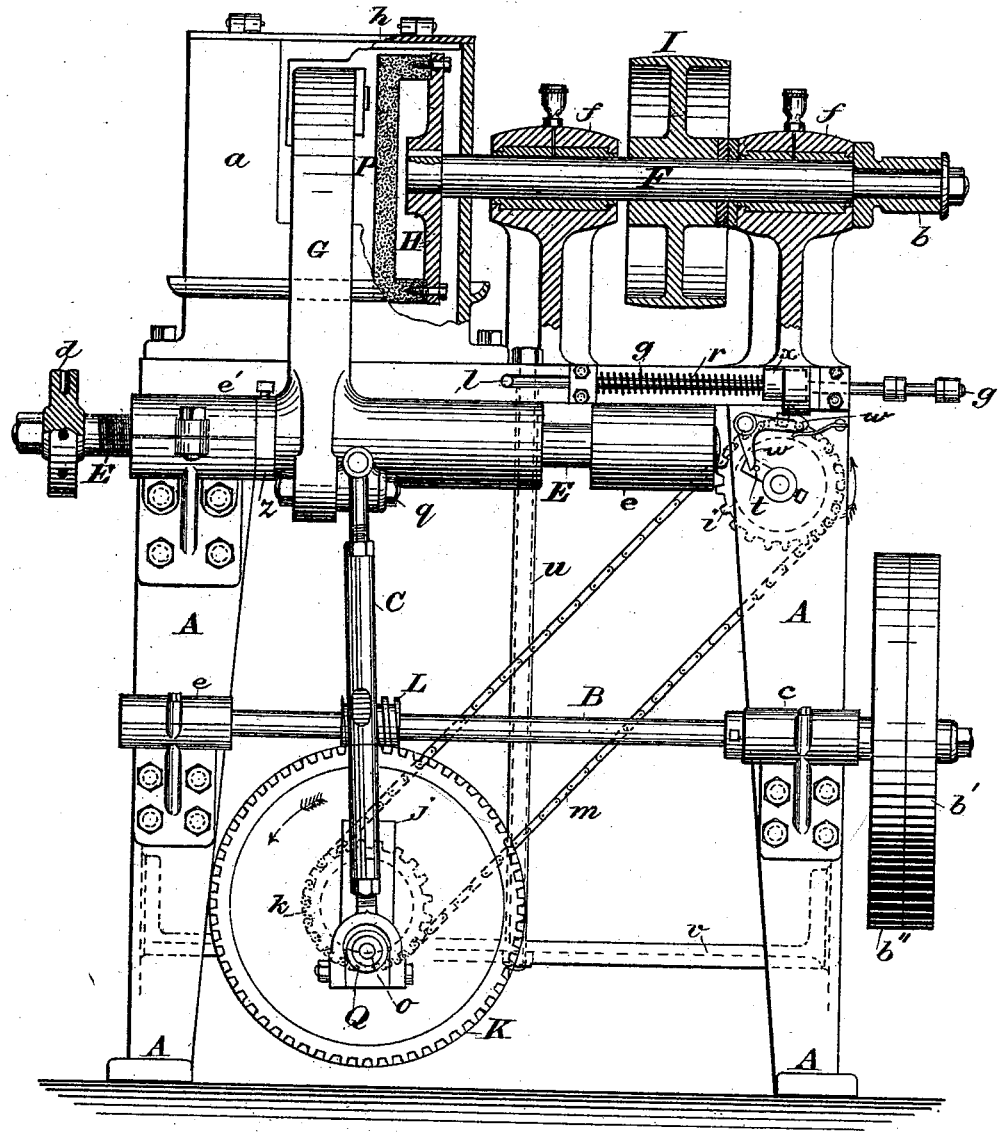
Figure 2:
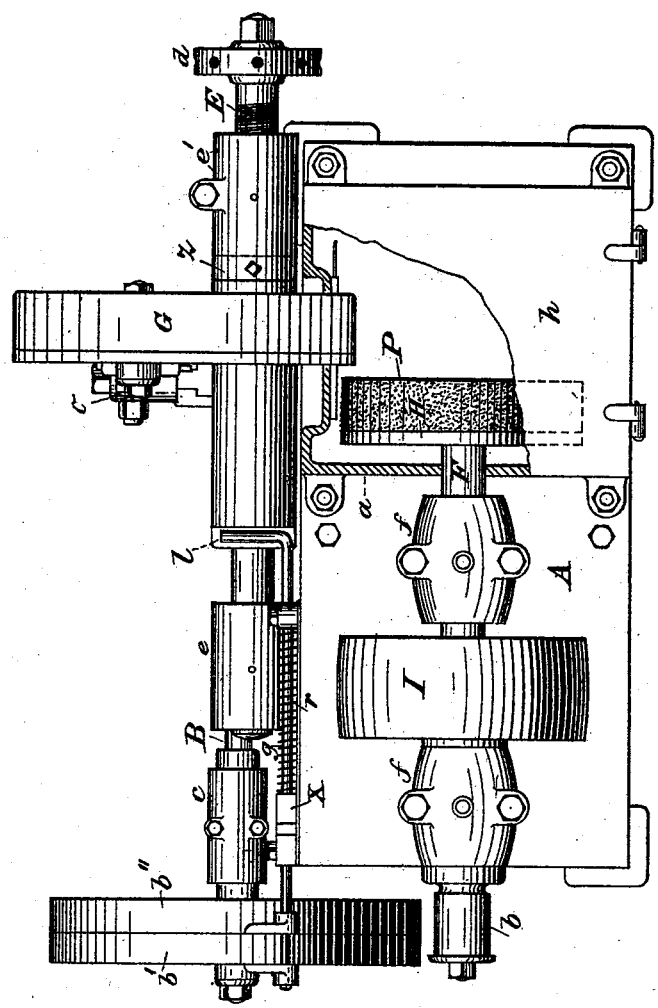

In the said drawings, Figure 1 is a side elevation of the machine; Fig. 2, a top view thereof, and Fig. 3 an end view of the same.

Briefly speaking, the machine consists in the supporting framework or stand A, the grinding mechanism proper comprising the grinding-wheel P, face-plate H, and pulley I, all of which are rigidly secured directly or indirectly to the shaft F, the work holding and operating mechanism comprising the arm G, connecting-rod C, worm-wheel K, worm L, shaft B, and pulleys $b$ $b'$ $b''$, the mechanism for automatically stopping the work-holding arm G when one side of a knife is ground and another knife replaced by the attendant or operator, comprising the belt-shifting rod $g$ and its actuating-spring $r$, the pawl $s$, sprocket-wheels $k$ and $i$ and chain $m$.

Power is transmitted to the entire machine through the main pulley I and to the work-holding arm and automatic stop therefor intermediately by the small pulley $b$, rigid with the grinding-shaft F.

Before proceeding with the description in detail it will be understood that the grinding-wheel is in continuous motion while the machine is on duty and that the automatic stopping mechanism applies only to the work-holding arm G.

The knife-blade to be operated upon has the usual perforations for rivets in the handle portion of the knife, and is held in place on the face of the work-holding arm G by a small stud and a shouldered button or hook thereon. The end perforation in the said knife-blade is placed over the small stud $g'$ above mentioned, and the lower edge of the handle portion of the knife rests on the said shouldered button or hook $g''$. The pressure of the grinding-wheel retains the blade snugly against the face of the arm G during the process of grinding. This means of holding work to be ground is quite old and no claim is made to the same.

Having briefly outlined the machine as a whole, the details thereof are as follows:

A is the general supporting framework or stand. This should be of heavy solid-iron structure of sufficient weight and strength to insure rigidity of parts and non-vibration of the machine as a whole. The said frame A is further strengthened by vertical and horizontal braces $u$ and $v$.

F is the main shaft of the machine, to which the power-pulley I is rigidly attached. Upon one end of the shaft F is secured a face-plate H, which carries the grinding stone or wheel P. The said grinding-wheel P is usually and preferably made of emery and of cup-shaped or cylindrical form.

G is the work-holding arm, to which the knife-blade or other article to be ground is securely but removably attached upon the face thereof. The form of the arm G is most clearly seen upon reference to Fig. 3 of the drawings. The said arm G is hung or pivoted upon a round bar E, having a very slow oscillating movement thereon. The said bar E is mounted upon the stand A in heavy supports or "boxes" $e$ $e'$. The end of the round bar E which rests in the port $e$ is plain and the opposite end, which rests in the support $e'$, is screw-threaded and engages in screw relation with the said support $e'$. The screw-thread on said bar E should have a slow thread thereon, as the feed-motion is intended simply to compensate the wear of the grinding-wheel toward which it is slowly fed, as required. The work-holding arm G is mounted on the said bar E and is capable of an oscillating movement thereon in a vertical plane transverse to the grinding-wheel shaft. Collars on the said bar E, secured by set-screws, hold the arm G in position thereon. While two such collars may be employed, I usually prefer to use one only $z$ and place it on the bar E toward the screw end of said bar. A disk-wheel $d$ is rigidly attached to the screw end of the bar E, having radial perforations in the periphery thereof for the insertion of a hand lever or rod in turning the same when feeding the work-holding arm G toward the grinding-wheel P.

The oscillating movement of the work-holding arm G results from the following transmission of power: The small pulley $b$ on the shaft F communicates by belt with the pulley $b''$, rigid on the shaft B. The worm L thereon gears with the worm-wheel K. A rod C, having a knuckle-joint on each end thereof, connects a crank-pin $o$ on the said worm-wheel to a pin $q$ on a lever-arm extending from the main work-holding arm G.

Figure 3:
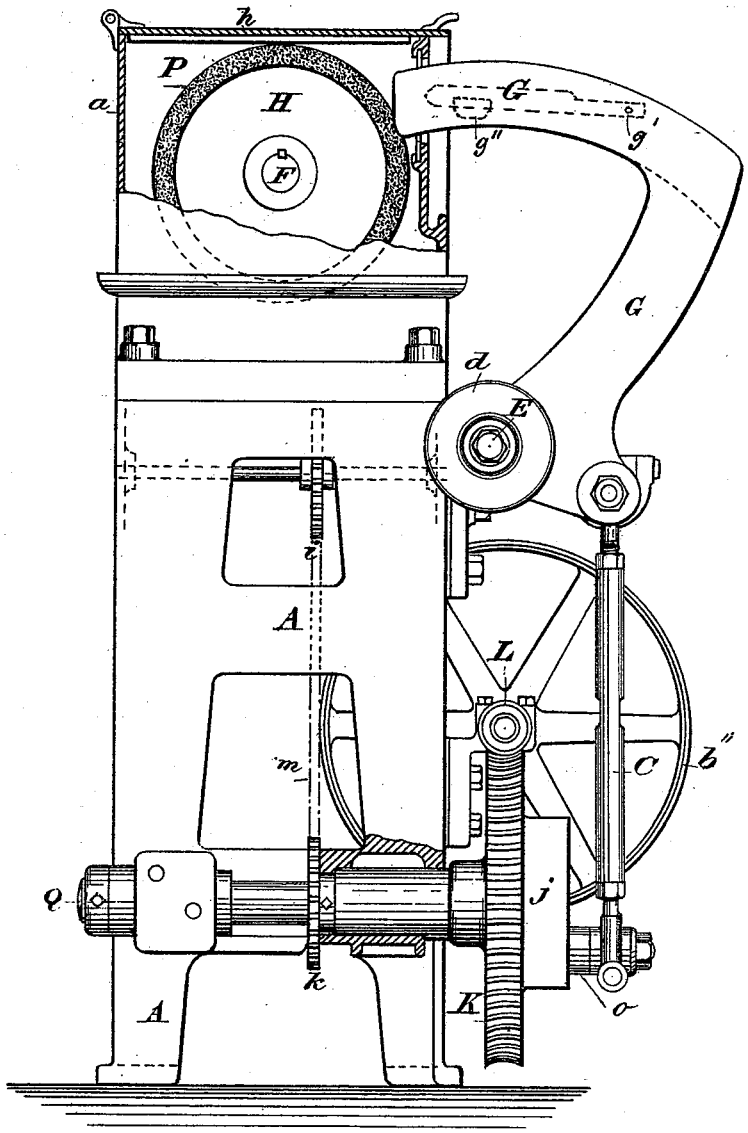

Mechanism for automatically stopping the arm G when it has finished grinding one side of a knife-blade or other article is provided as follows: A belt-shifting rod $g$ is normally actuated in an outward direction by means of a spiral compression-spring $r$ encircling the same. The said rod $g$ is provided on its outer end with a fork, which straddles the belt. A spring-actuated hook or latch W mounted on the body of the machine, engages with the rod $g$, or a hook on post $x$ thereon, or formed on a block secured to said rod $g$, and retains the latter in its inner position, keeping the belt on the tight or driving pulley. A sprocket-wheel $k$ on shaft Q connects with a similar wheel $i$ by means of a sprocket-chain. The shaft upon which the sprocket-wheel $i$ is mounted has a collar secured thereon by a set-screw. The said collar has an arm or extension provided with a pin or stud $t$ thereon, which trips the latch or hook W, and releases the rod $g$, which is thus automatically thrown outward by the spring $r$, and the belt is shifted to the loose pulley $b'$—that is to say, at every complete revolution of the sprocket-wheel $i$ the mechanism operating the arm C is stopped automatically. To set this in motion again, the attendant draws the belt-shifting arm $g$ inwardly until it is latched in place by the hook W, and there retained until released as stated. This means of shifting a belt is not new, being well understood in the art to which it relates. This is arranged to take place when the work-holding arm G is in the extreme outward limit of its movement, as seen in Fig. 3. The oscillating work-holding-arm mechanism is thrown into active operation by retraction of the rod $g$, the handle $l$, formed by an angle on the said rod being provided for this purpose. The stroke of the arm G can be regulated in its length from zero to its greatest limit by shifting the crank-pin $o$ in its slotted holder $j$, rigid with the worm-wheel K, upon well-understood principles of mechanics. In this manner various lengths of knife-blades can be operated upon with but little or no lost motion of the holding-arm G—that is to say, the crank-pin $o$ is set so as to give a sweep to the said arm corresponding, or nearly so, to the length of the surface to be ground.

It is usual to employ a stream of water upon the grinding-wheel, and also to keep the same partially submerged. For this purpose the grinding-wheel P is incased by a box $a$, having a hinged lid $h$ thereon, an opening in one side, through which the work-holding arm G travels, and a proper outlet and inlet for the water.

The practical operation of the machine is as follows: The knife-blade or other article to be ground is secured to the face of the work-holding arm G when the latter is in its extreme outward throw, as seen in Fig. 3, and in inactive position. The belt-shifting rod $g$ is then pulled inwardly and latched automatically, the belt being thus shifted to the tight pulley $b''$ and the arm G thus set in motion. The arm travels one stroke slowly forward, the knife thereon bearing against the grinding-wheel P and returns at the same speed to its starting-point. The knife or blade is then removed, another replaced, and the operation repeated. The arm G is fed toward the grinding-wheel, as occasion requires, from the wearing down of the grinding-wheel by turning the disk wheel $d$, and thus carrying the arm G very slightly forward, as will be understood.

The machines can be used in grinding "right" and "left," respectively, without material alteration in their structure. For this purpose two machines may be employed, one running with a straight belt on the pulley I and the other with a crossed belt thereon.

I claim—

1. A machine for grinding cutlery, saws and other articles of hardware requiring a flat surface, or a flat even bevel comprising a supporting stand, a grinding wheel mounted thereon, an oscillating arm provided with a lever and lever pin, a longitudinally adjustable bar supporting the said arm, a worm and worm-wheel, a crank pin on the latter, a rod connecting the said crank pin and lever pin and means for application and transmission of power, all arranged and co-operating substantially as described.

2. In a machine for grinding cutlery, saws and other articles of hardware requiring a flat surface or a flat even bevel, in combination with a grinding wheel, a work holding arm oscillating in a plane substantially at right angles to the grinding wheel shaft, a bar pivotally supporting the said arm, the said bar having a longitudinally adjustable feed movement, the said arm being hung thereon and secured from endwise movement on the same, substantially as described.

3. A machine for grinding cutlery, saws and other articles of hardware requiring a flat surface or a flat even bevel, comprising a supporting stand, a grinding wheel mounted thereon, an oscillating arm provided with a lever and lever pin, a longitudinally adjustable bar supporting the said arm, a worm and worm wheel, a crank pin on the latter, a rod connecting the said crank pin and lever pin, an automatic arm stopping device comprising sprocket wheels $k$ and $i$ and chain $m$ thereon, a spring actuated belt shifting rod $g$ retaining pawl $s$ and tripping stud $t$ on sprocket wheel $i$ arranged and coöperating as a whole, substantially as described.

In testimony that I claim the invention above set forth I affix my signature in presence of two witnesses.

ALFRED F. BANNISTER.

Witnesses:
JAMES T. MOUNT,
SUSIE H. MOORE.